Figure 1:
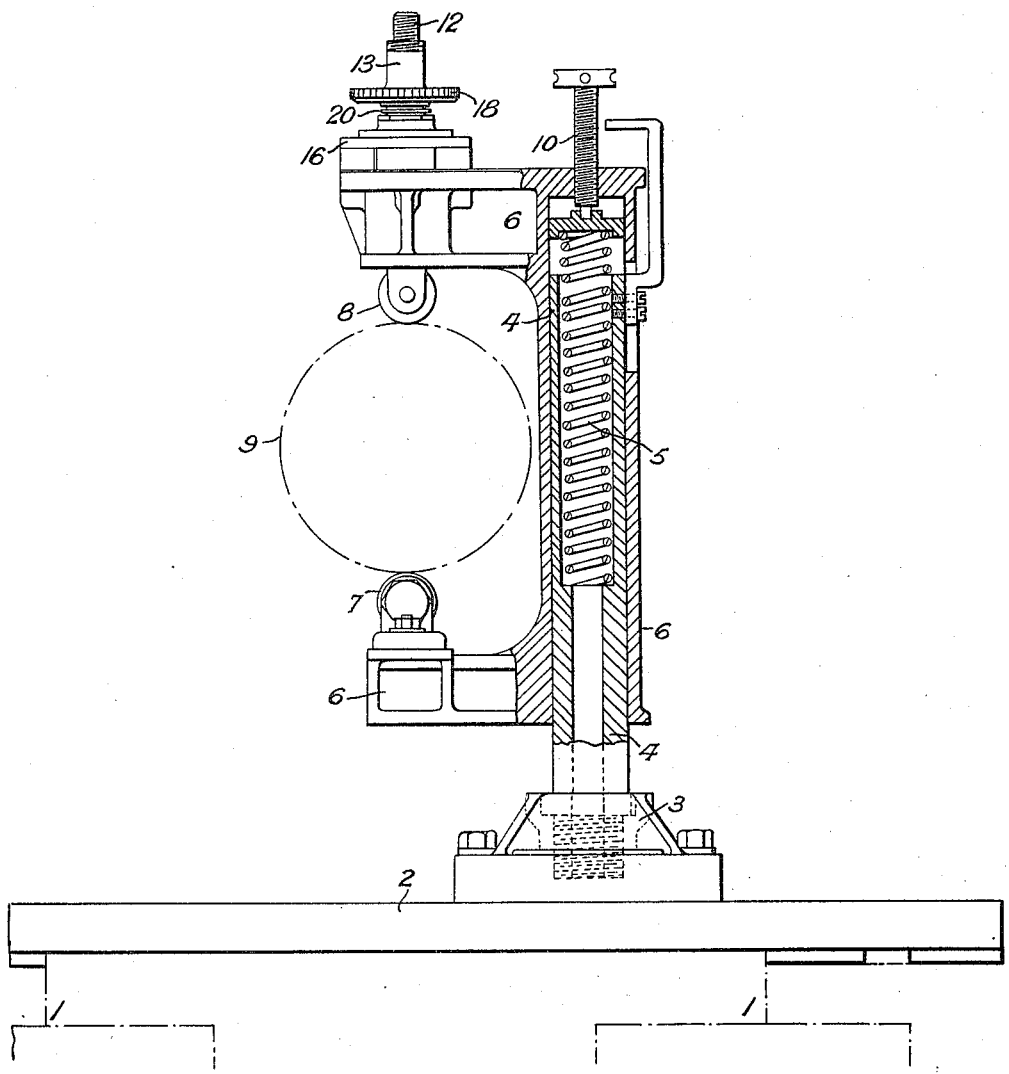

R. H. CARPMAEL AND J. C. SOTHAM.
APPARATUS FOR AUTOMATICALLY SETTING TOOLS OR FOR FACILITATING THE SETTING OF THE SAME.
APPLICATION FILED DEC. 16, 1918.

1,305,878.

Patented June 3, 1919.
5 SHEETS—SHEET 1.

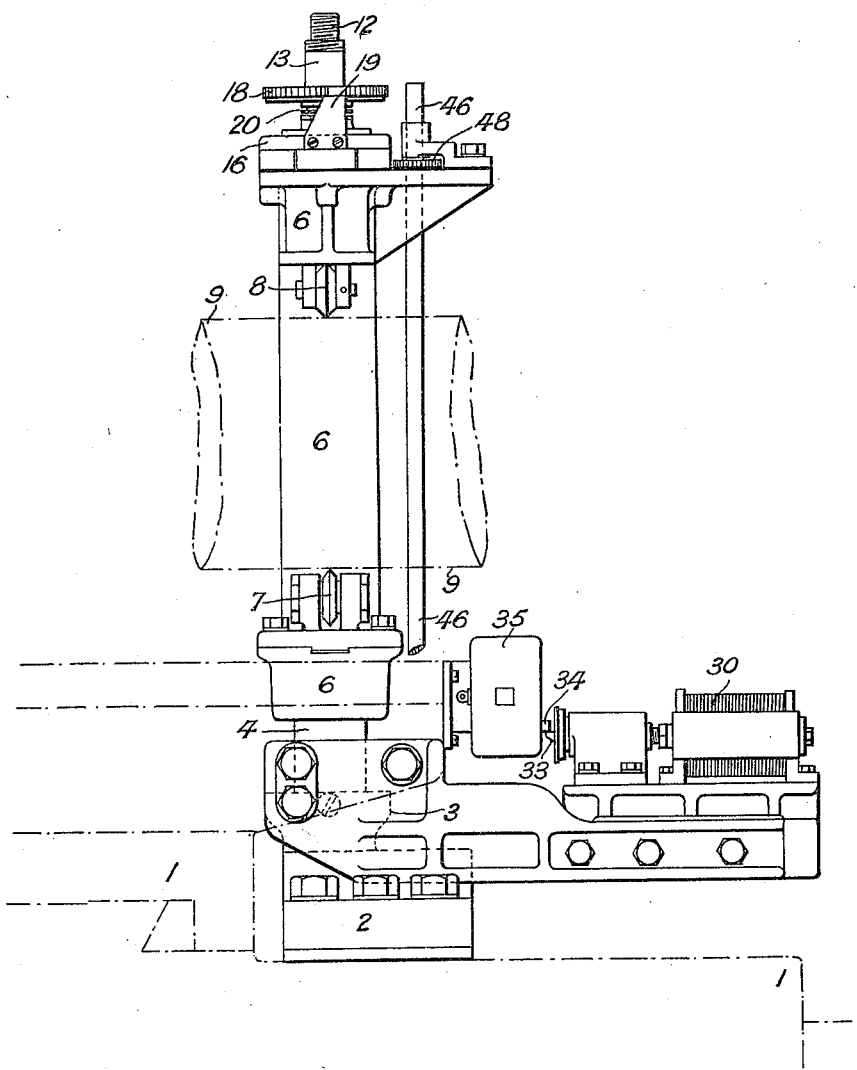

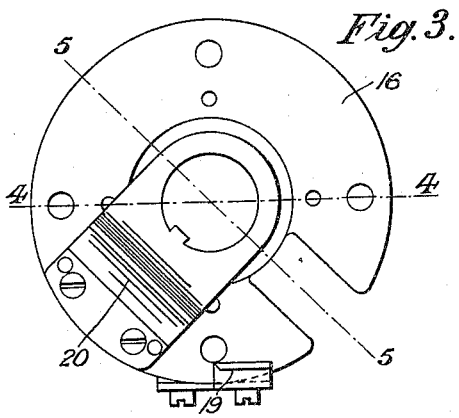
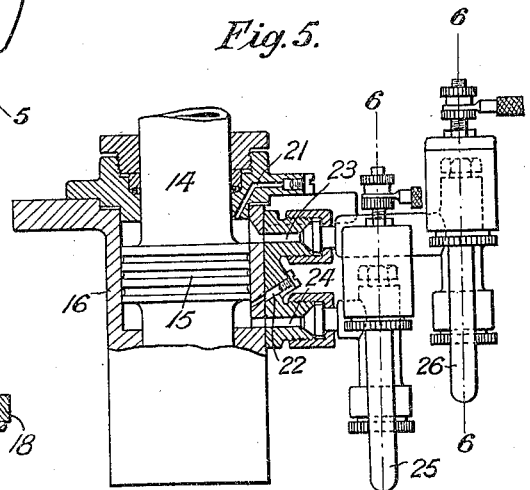
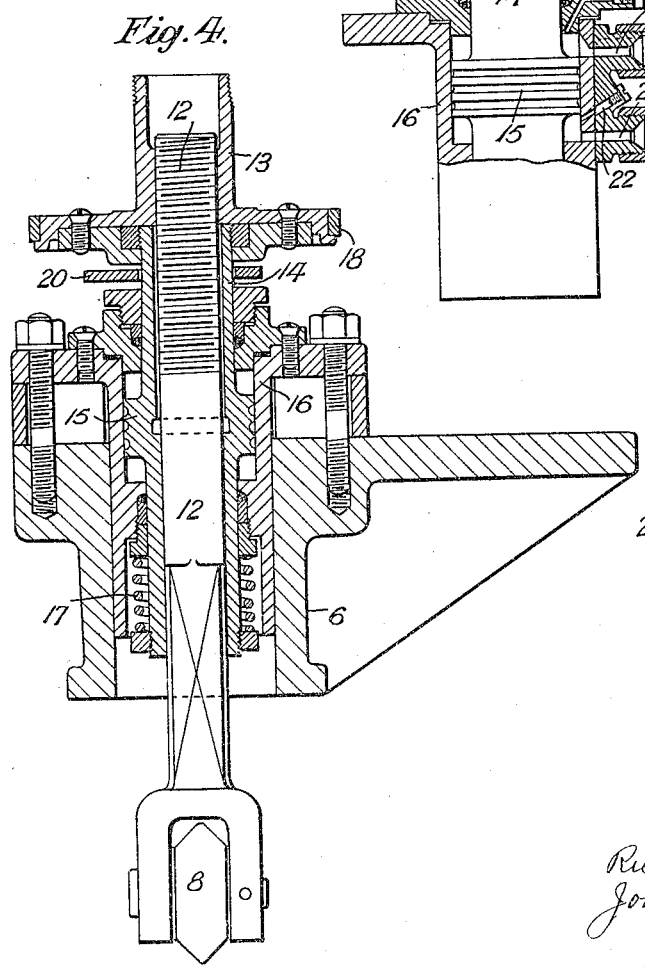
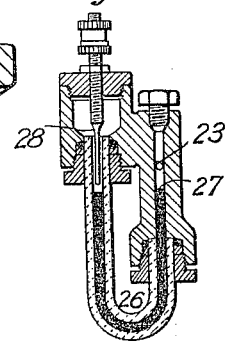

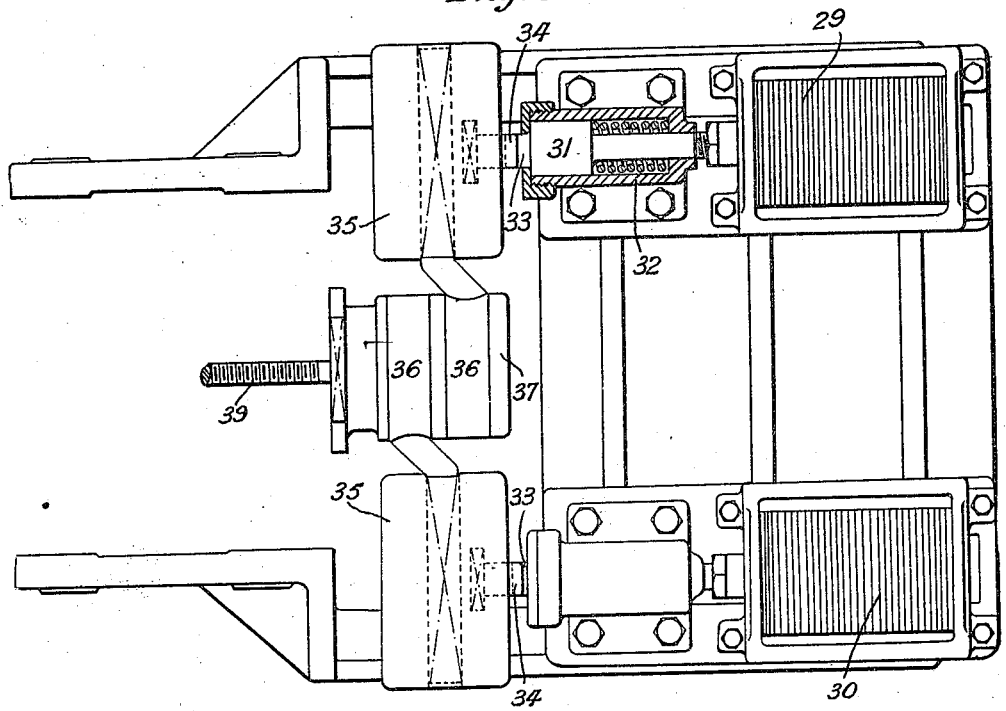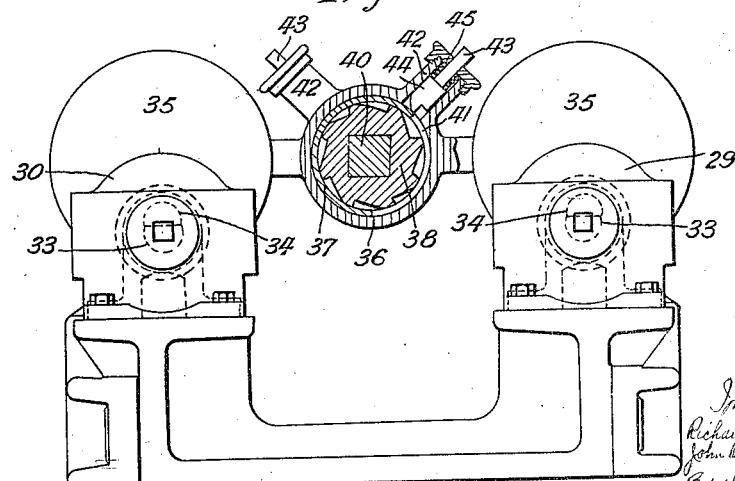

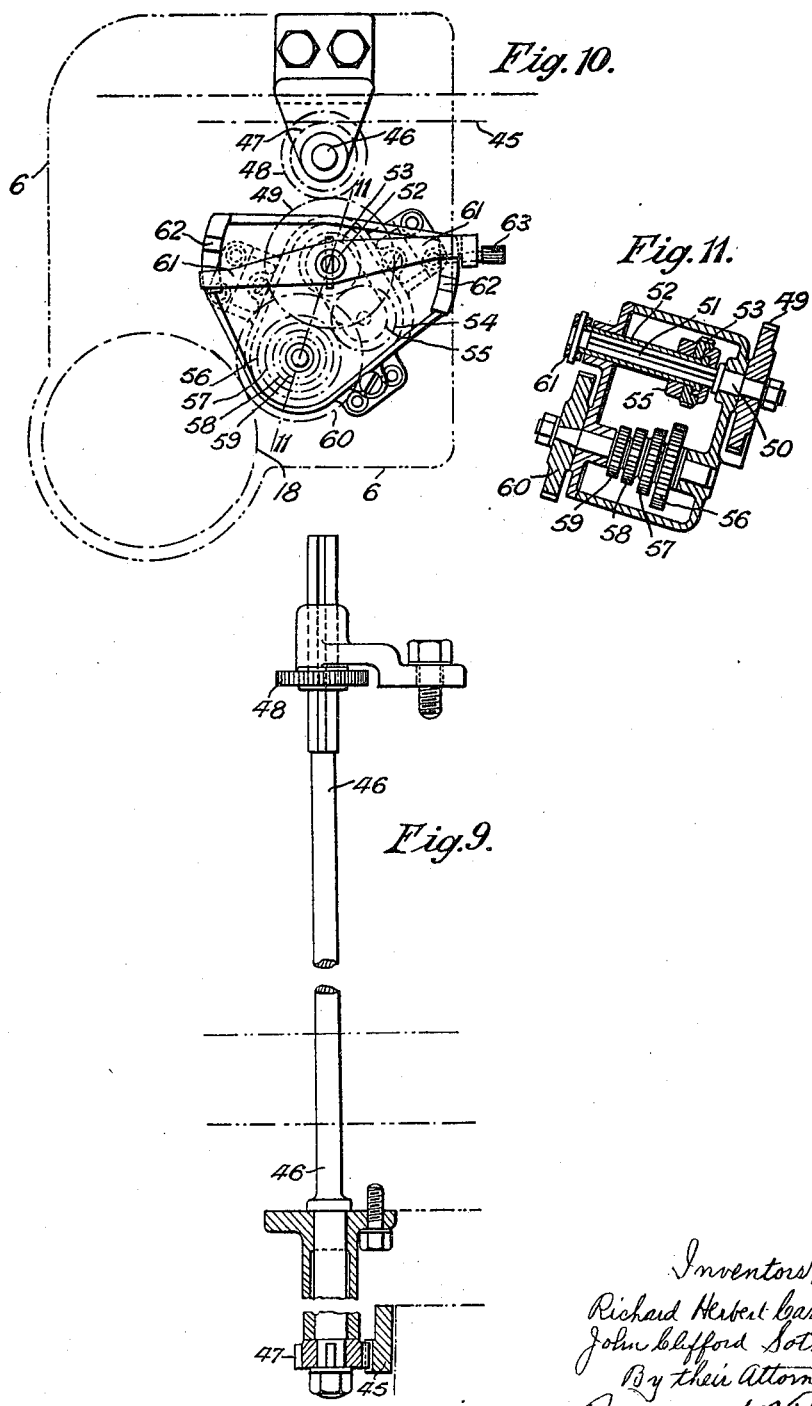

UNITED STATES PATENT OFFICE.

RICHARD HERBERT CARPMAEL AND JOHN CLIFFORD SOTHAM, OF COVENTRY, ENGLAND, ASSIGNORS TO THE COVENTRY ORDNANCE WORKS, LIMITED, OF COVENTRY, ENGLAND.

APPARATUS FOR AUTOMATICALLY SETTING TOOLS OR FOR FACILITATING THE SETTING OF THE SAME.

1,305,878.  Specification of Letters Patent.  Patented June 3, 1919.

Application filed December 16, 1918. Serial No. 267,066.

*To all whom it may concern:*

Be it known that we, RICHARD HERBERT CARPMAEL and JOHN CLIFFORD SOTHAM, subjects of the King of Great Britain, residing at Ordnance Works, Coventry, England, have invented a new and useful Improved Apparatus for Automatically Setting Tools or for Facilitating the Setting of the Same, of which the following is a specification.

This invention relates to improved apparatus for automatically setting tools of tooling or abrading machines or for facilitating the setting of the same with relation to the work. The term tool is therefore to be understood as including a cutting tool, an abrading wheel or the like.

According to this invention a deviation from a normal size of the work is indicated through the movement of a movable member of a gage maintained in contact with the work, and hydrostatic means are provided for magnifying such movement.

When the tool is to be set automatically or semi-automatically the movement of the liquid is utilized to move the tool; for example, by starting an electric motor.

When desired the magnified deviation from the normal of the portion of the work just tooled is indicated by an audible signal, or by the movement of liquid in a tube or the deviation in either direction may be indicated by different colored lamps. The operator then knows whether the tool should be fed in or away from the work.

The accompanying drawings illustrate the invention as applied to semi-automatic means fixed to a lathe for setting a tool.

In the drawings Figure 1 is an end elevation partly in section, Fig. 2 is a front elevation, Fig. 3 is a plan of the cylinder head and the locking plate preventing the piston turning in the cylinder, Fig. 4 is a section on the line 4—4 of Fig. 3, Fig. 5 is a section on the line 5—5 of Fig. 3 and Fig. 6 is a section on either of the lines 6—6 Fig. 5, Fig. 7 is a plan of the mechanism for setting a tool on the closing of an electric current and Fig. 8 is an elevation partly in section of the same.

Figs. 9, 10 and 11 show means for automatically and continuously altering the position of the movable gage member with relation to its piston when it is desired to make tapered work, Fig. 9 being a detail, Fig. 10 a plan and Fig. 11 a section on the line 11—11 of Fig. 10.

Referring more particularly to Figs. 1 and 2, 1 is the lathe saddle, 2 a base plate fixed to the saddle; 3 is a socket fixed to the plate into which screws a hollow pillar 4 containing a spring 5 which presses a frame 6 upward. The lower portion of the frame carries a roller 7 and the upper portion a roller 8; the roller 7 is forced to bear against the work 9 by the spring 5 whose power is adjusted by means of a screwed rod 10; the rollers 7 and 8 are situated a little in rear of the line of work.

As illustrated in Fig. 4, the roller 8 is mounted at the end of a screw threaded spindle 12, screwing into a socket 13 forming an extension of and connected to the trunk 14 of a piston 15 working in a cylinder 16. 17 is a spring tending to move the piston 15 downward and therefore to keep the roller 8 in contact with the work. 18 is a micrometer wheel fast with the socket 13 and provided with graduations which correspond with the diameter of the finished work, and 19 is a pointer opposite which the required graduation is placed. The micrometer wheel 18 when turned in either direction alters the position of the piston 15 relatively to the spindle 12, the piston being prevented from turning by a locking plate 20.

The cylinder 16 contains oil or other fluid on both faces of the piston 15 and is provided as shown in Fig. 5 with passages 21 and 22 for the escape of air and with passages 23 and 24 which convey oil from above and below the piston 15 to U shaped glass tubes 25 and 26 containing mercury 27.

As illustrated in Fig. 6 each tube 25 and 26 contains a terminal 28 which when in contact with the mercury 27 forms part of an electric circuit which comprises one of the pair of solenoids 29 or 30 shown in Figs. 2, 7 and 8.

Each core of the solenoids 29 and 30 is connected to a plunger 31 moving when the core is sucked in against the action of a spring 32. The plungers 31 terminate in a nob 33 upon which the ends of projections 34 on balance weights 35 normally rest. The weights 35 are carried by sleeves 36 which turn upon a bush 37 which surrounds a pair of ratchets 38; and the ratchets 38 are mounted on a square 40 on the shaft 39. The bush 37 is provided with a pair of slots 41, one for each ratchet, which have teeth arranged in opposite directions. The sleeves 36 are provided with sockets 42 which contain a plunger 43 terminating in a pawl 44 and pressed by a spring 45 normally against the bush 37, but when a sleeve 36 is turned by its weight 35 in one direction or the other one of the pawls 44 passes through its slot 41 and engages with the ratchet 38 and operates it and so turns the shaft 39 which operates the small slide rest carrying the tool.

The apparatus works as follows:—the apparatus is placed in position on a lathe, the work to be tooled being for about three quarters of an inch correctly turned to the required diameter. The rollers 7 and 8 are then placed in contact with the tooled work and the piston 15 adjusted so that it is in its mid position, and this will bring the graduation required on the micrometer wheel 18 corresponding to the diameter required opposite the pointer 19. The terminals 28 are connected to relay circuits of low voltage which operate a pair of small solenoids not shown which bring into operation a high voltage current which operates the large solenoids 29 and 30, the mercury 27 in the glass tubes 25 and 26 being about 0.15 to 0.25 of an inch from the end of the terminals 28 according to the accuracy of work desired.

The lathe is now set in motion and so long as the cut of the tool is correct no action takes place, but so soon as an inaccuracy occurs which causes too little cut, the roller 8 is forced upward, and therefore moves the piston 15 upward which delivers oil through the passage 23 on to the mercury 27 in the U tube 26 which thus comes into contact with the terminal 28 and so closes the relay circuit including a solenoid 29 or 30; the energized solenoid sucks in its core which draws back its spring plunger 31 thus withdrawing its nob 33 from beneath its projection 34 and so releases its weight 35.

The sleeve 36 turns and so brings the pawl 44 into the slot 41 thus allowing the spring 45 to push a pawl 44 into engagement with its ratchet 38; the square 40 turns and so causes the shaft 39 to feed the tool in. The operator now slowly lifts the weight and if the error is corrected and the work has come back to its standard size the solenoid 29 or 30 is deënergized, the nob 33 on the plunger 31 will again be in position to retain the corresponding projection on the weight 35 and the pawl 44 will ride up upon the bush 37. If the work is still of greater diameter than the standard the weight 35 will again fall and the operation be repeated and the tool still farther advanced.

If for any reason the tool is set to give too much cut the apparatus works in the same manner but oil flows from the passage 24 into the U tube 25 and the other solenoid 29 or 30 is energized.

This apparatus is also useful for tooling tapered work such as required for gun making as mechanism can be devised for automatically and continuously turning the micrometer wheel to the extent required.

Thus the lathe may be provided with a stationary rack which gears with a spur wheel moving with the lathe saddle; the spindle of the spur wheel then through suitable gearing drives the micrometer wheel.

In order that different tapers may be cut the drive takes place through change speed gear.

Referring to Figs. 2, 9, 10 and 11, 45 is the stationary rack, 46 the spindle fixed to the lathe saddle and to which are keyed a spur wheel 47 in gear with the rack 45 and a spur wheel 48 driving a toothed wheel 49.

The wheel 49 is fast with a spindle 50 provided with a groove 51 and on which is slidably mounted a sleeve 52 which carries a toothed wheel 53 free to turn on it but rotating with the spindle 50. Gearing with the wheel 53 is a wheel 54 carried by an arm 55 fast with the sleeve 52 which according as the sleeve is slidden on its spindle 50 can be brought opposite any one of four gear wheels 56, 57, 58 or 59, which drive a spur wheel 60 in mesh with the micrometer wheel 18.

For the purpose of changing gear to the top of the sleeve 52 is fixed a lever 61 whose ends engage with two of four pairs of stepped surfaces 62 and which can be maintained in either of its four positions by a spin 63.

To change gear, the pin 63 is removed from its hole and the lever 61 placed on one of the pair of stepped surfaces 62 desired, thus both sliding the sleeve 52 on the spindle 50 and turning the arm 55 to bring the wheel 54 into mesh with the gear wheel 56—59 selected.

The tool setting arrangement may be made wholly automatic if an electric motor is arranged to feed the tool in or out according as it is set in rotation in one direction or the other; for this purpose the terminals in the U tubes are arranged in circuits which when closed by the mercury in the tubes start the motor in different directions.

The apparatus may also be adapted to cut or abrade hollow work.

When great accuracy is not desired the lower rollers may be omitted.

What we claim is:—

1. Apparatus for facilitating the setting of tools which comprises a tool, a spindle whose end is maintained in contact with the work while the machine is running, a piston connected to the spindle, a cylinder containing liquid, and a passage connecting the cylinder with a tube, the said tube being smaller in cross section than the cylinder.

2. Apparatus for facilitating the setting of tools which comprises a tool, a spindle whose end is maintained in contact with the work while the machine is running, a piston connected to the spindle, a cylinder containing liquid, a passage connecting the cylinder with a tube, the said tube being smaller in cross section than the cylinder and means operated by the movement of the liquid for moving the tool.

3. Apparatus for facilitating the setting of tools which comprise a tool, a spindle whose end is maintained in contact with the work while the machine is running, a piston connected to the spindle, means for altering the relation of the spindle with the piston, a cylinder containing liquid and a passage connecting the cylinder with a tube also containing liquid.

4. Apparatus for facilitating the setting of tools which comprise a tool, a gage situated near the tool, a piston operated by the movement of a movable portion of the gage, a cylinder containing liquid, a passage connecting the cylinder with a tube containing mercury, and a contact adapted to be touched by the mercury on the expulsion of liquid from the cylinder by the movement of the piston.

5. Apparatus comprising a tool, a gage situated near to the tool and having a movable member carried on a spindle, a piston connected to the spindle, means for altering the relation of the spindle with the piston, a cylinder containing liquid, a passage connecting the cylinder with a tube containing mercury and a contact adapted to be touched by the mercury on the expulsion of liquid from the cylinder by the movement of the piston.

6. Apparatus for facilitating the setting of tools which comprise a tool, a gage situated near to the tool, a piston operated by the movement of a movable portion of the gage, a cylinder containing liquid, a passage connecting the cylinder with a tube containing mercury, a contact adapted to be touched by the mercury on the expulsion of liquid from the cylinder by the movement of the piston, and electrically operated means for feeding the tool.

7. Apparatus for facilitating the setting of tools which comprise a tool, a gage situated near to the tool, a piston operated by the movement of a movable portion of the gage, a cylinder containing liquid, a passage connecting the cylinder with a tube containing mercury, a contact adapted to be touched by the mercury on the expulsion of liquid from the cylinder by the movement of the piston, a weight whose fall is adapted to feed the tool and electrically operated means for releasing the weight.

8. Apparatus comprising a tool, a gage situated near to the tool and having a movable member carried on a spindle, a piston connected to the spindle, automatic means for altering the relation of the spindle, with the piston, a cylinder containing liquid and a passage connecting the cylinder with a tube containing liquid.

England, 19 Nov., 1918.

RICHARD HERBERT CARPMAEL.
JOHN CLIFFORD SOTHAM.

Signed in the presence of—
ARTHUR B. INSTONE,
BERT J. KNIGHTON.

Copies of this patent may be obtained for five cents each, by addressing the "Commissioner of Patents, Washington, D. C."